United States Patent [19]

Frosig et al.

[11] Patent Number: 5,285,226
[45] Date of Patent: Feb. 8, 1994

[54] PHOTOGRAPHIC COPY STAND AND BASE THEREFOR

[75] Inventors: Peter A. Frosig, Rochester; William L. Burnham, LeRoy, both of N.Y.

[73] Assignee: Eastman Kodak Company, Rochester, N.Y.

[21] Appl. No.: 7,687

[22] Filed: Jan. 22, 1993

[51] Int. Cl.$^5$ .................. G03B 15/03; G03B 27/54
[52] U.S. Cl. .................. 354/81; 354/149.1; 355/21; 355/67; 248/174
[58] Field of Search ............. 354/81, 149.1, 141; 355/21, 43, 45, 51, 65, 66, 67; 229/113, 162, 190, 195; 248/174, 176

[56] References Cited

U.S. PATENT DOCUMENTS

| | | | |
|---|---|---|---|
| 891,347 | 6/1908 | Kroedel | 355/21 |
| 2,433,133 | 12/1947 | Lindsey | 88/24 |
| 2,813,456 | 11/1957 | Ostrov | 88/24 |
| 3,514,206 | 5/1970 | Harvey et al. | 355/67 |
| 3,737,226 | 6/1973 | Shank | 355/67 |
| 3,742,835 | 6/1973 | Bahnsen | 95/86 |
| 4,701,039 | 10/1987 | Johnson | 354/80 |
| 5,103,249 | 4/1992 | Keene | 354/85 |

Primary Examiner—Michael L. Gellner
Assistant Examiner—Eddie C. Lee
Attorney, Agent, or Firm—Roger A. Fields

[57] ABSTRACT

A copy stand for supporting a camera having a built-in flash device to photograph a subject in an exposure area. The stand comprises a continuous sheet of paper board folded and coupled to itself to form a generally tubular section adapted to surround the subject in the exposure area and establish the position of the subject relative to the camera and flash. The tubular section includes a baffle, which blocks direct flash illumination of the exposure area, a first diffuse reflector, which directs flash illumination around the baffle and toward the exposure area, and a second diffuse reflector on the opposite side of the exposure area from the first reflector. The second reflector redirects illumination from the first reflector back toward the exposure area, thereby illuminating the subject area from multiple directions.

10 Claims, 4 Drawing Sheets

PHOTOGRAPHIC COPY STAND AND BASE THEREFOR

FIELD OF THE INVENTION

The invention relates generally to the field of photography and more particularly to a copy stand for locating a camera relative to a subject to be photographically copied. Still more specifically the invention relates to such a copy stand, and copy-stand base, for use with a camera having a built-in flash device, wherein the copy-stand base blocks direct flash illumination of the subject while enhancing indirect flash illumination of the subject.

BACKGROUND OF THE INVENTION

Description of the Prior Art

It is well known in the prior art to provide a copy stand for positioning a camera relative to a subject to be photographically copied. It also is known to use reflecting surfaces on such copy stands to enhance illumination of the subject, including illumination by a flash device integral with the camera.

U.S. Pat. No. 3,514,206, Issued to D. M. Harvey on May 26, 1970, discloses a collapsible copy stand for use with a camera having a flash device. His copy stand includes structure for receiving a camera at one end and for locating a subject to be copied a predetermined distance from the camera at the opposite end. A baffle blocks direct flash illumination of the subject while a diffuse reflector redirects the flash illumination around the baffle to illuminate the subject indirectly. Although entirely satisfactory for its intended purpose, the Harvey copy stand includes numerous pieces or parts that must be fabricated and assembled. Additionally, it has only one diffuse reflector between the camera flash and the subject to be copied. Illumination of the subject is from only one direction and stray illumination is lost to the outside of the copy stand.

Another collapsible copy stand is disclosed in U.S. Pat. No. 891,347, Issued to R. Kroedel on Jun. 23, 1908. The Kroedel copy stand includes a tubular casing formed of a series of flat panels hinged together by a continuous cover of fabric. The casing can be folded and collapsed for storage. The Kroedel stand has many advantages, but is not suitable for use with a camera flash device that illuminates the subject from a position adjacent the camera.

SUMMARY OF THE INVENTION

The present invention is directed to a copy stand for use with a camera having a flash device, wherein the copy stand overcomes one or more of the problems set forth above. Briefly summarized, according to one aspect of the invention, a copy stand includes a nest for supporting the camera and flash device, and a base coupled to the nest for defining an exposure area a predetermined distance from the camera and flash device. The base includes a baffle, which blocks direct flash illumination of the exposure area, a first diffuse reflector, which directs flash illumination around the baffle and toward the exposure area, and a second diffuse reflector, which redirects illumination from the first reflector toward the exposure area, thereby illuminating the subject area from multiple directions.

According to another aspect of the invention, the base comprises a continuous sheet of paper board folded and coupled to itself to form a generally tubular section. The tubular section extends from one end, coupled to the nest, to an opposite end, adapted to surround a subject in the exposure area and establish the position of the subject relative to the camera. The tubular section includes a baffle, for blocking the flash device from directly illuminating the subject, and a diffuse reflecting panel for defining with said baffle an opening in said generally tubular section. The reflector directs illumination around the baffle from the flash device toward the subject.

According to still another aspect of the invention, also for use with a camera including a flash device, paper board is cut and scored for assembly into a copy-stand base including a plurality of interconnected flat panels. When assembled by folding along the score lines, at least one of the panels is positioned to define the proper distance between the camera and the subject to be photographed. Another of the panels forms a baffle for blocking direct illumination of the subject by the flash device, while still another panel includes a diffuse reflecting surface for directing illumination around the baffle to illuminate the subject indirectly.

In one embodiment of the invention a copy-stand base is erected by folding and attaching the outermost panels together. In another embodiment, the panels are preassembled but collapsed like an accordion for storage.

These and other aspects, objects, features and advantages of the invention will be more clearly understood and appreciated from a review of the following detailed description and appended claims, and by reference to the accompanying drawings.

BRIEF DESCRIPTION OF THE DRAWINGS

Referring to the drawings.

DESCRIPTION OF THE PREFERRED EMBODIMENTS

Figure 1:
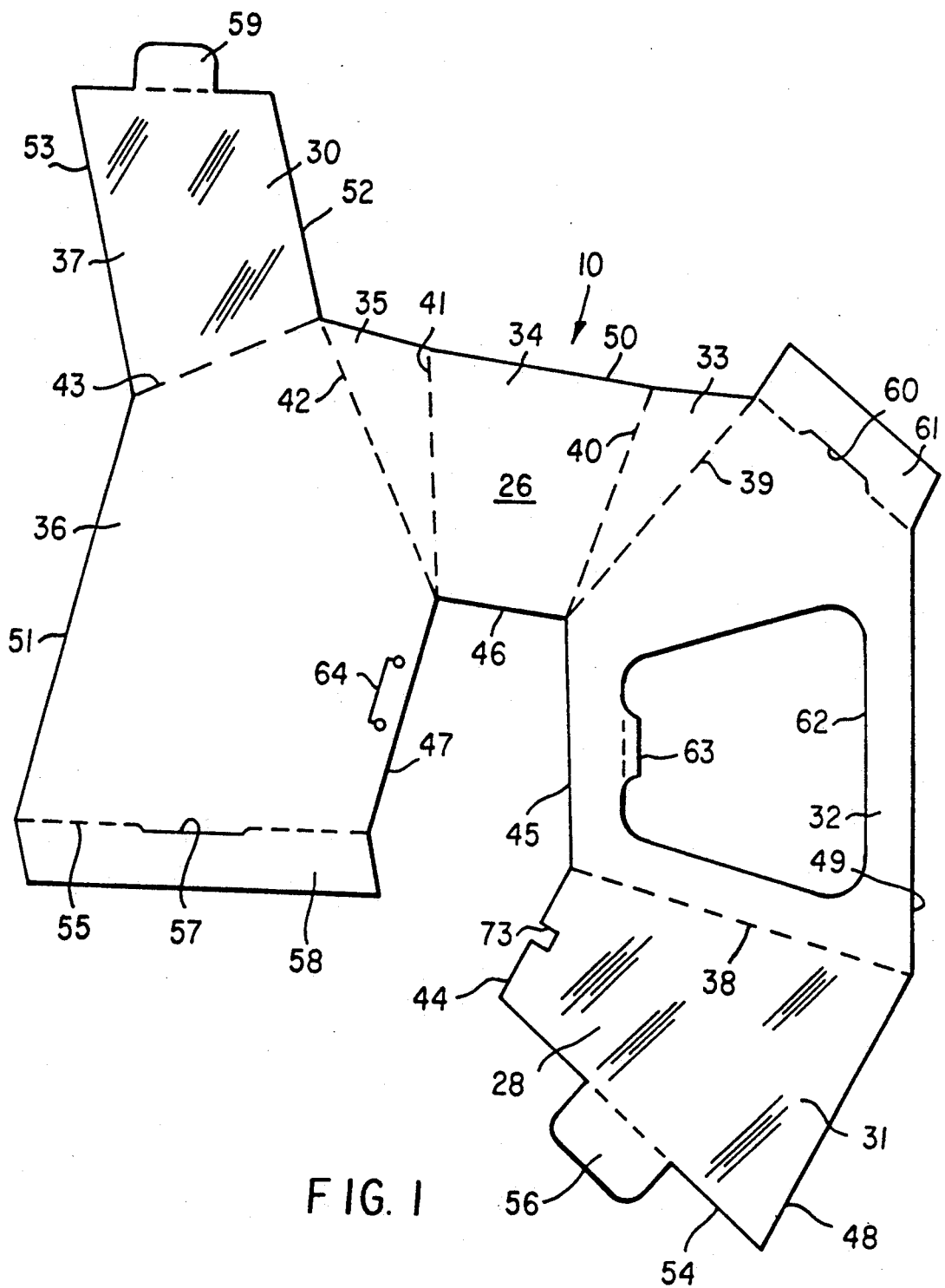
FIG. 1 is a plan view of sheet stock cut, scored and marked for assembly by folding into a copy-stand base according to one aspect of the invention.
Figure 2:
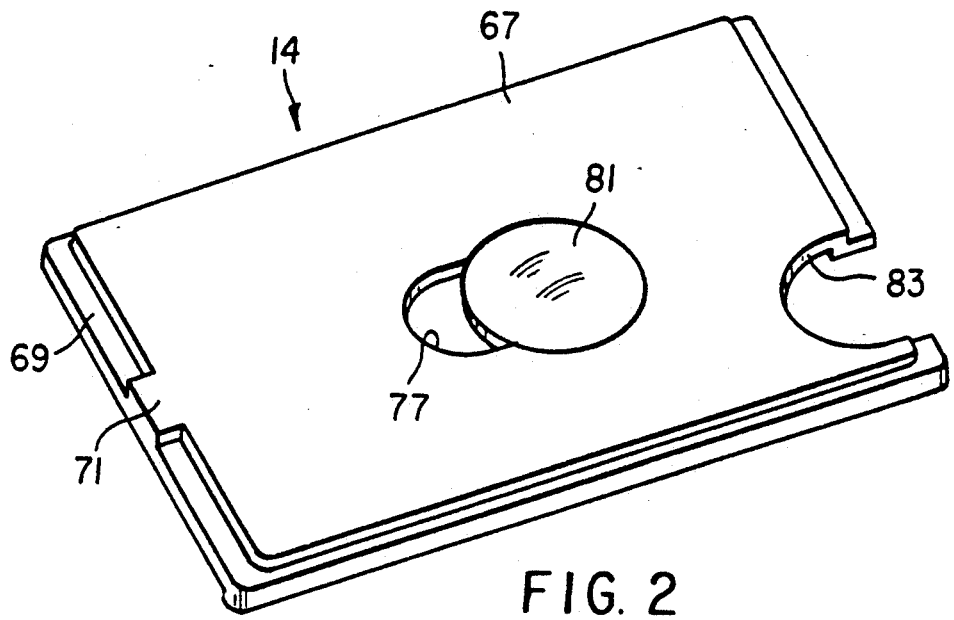
FIG. 2 is a bottom perspective view of a camera nest for a copy stand according to the invention and showing a rim and notch for mating with the copy-stand base in only one proper orientation.
Figure 3:
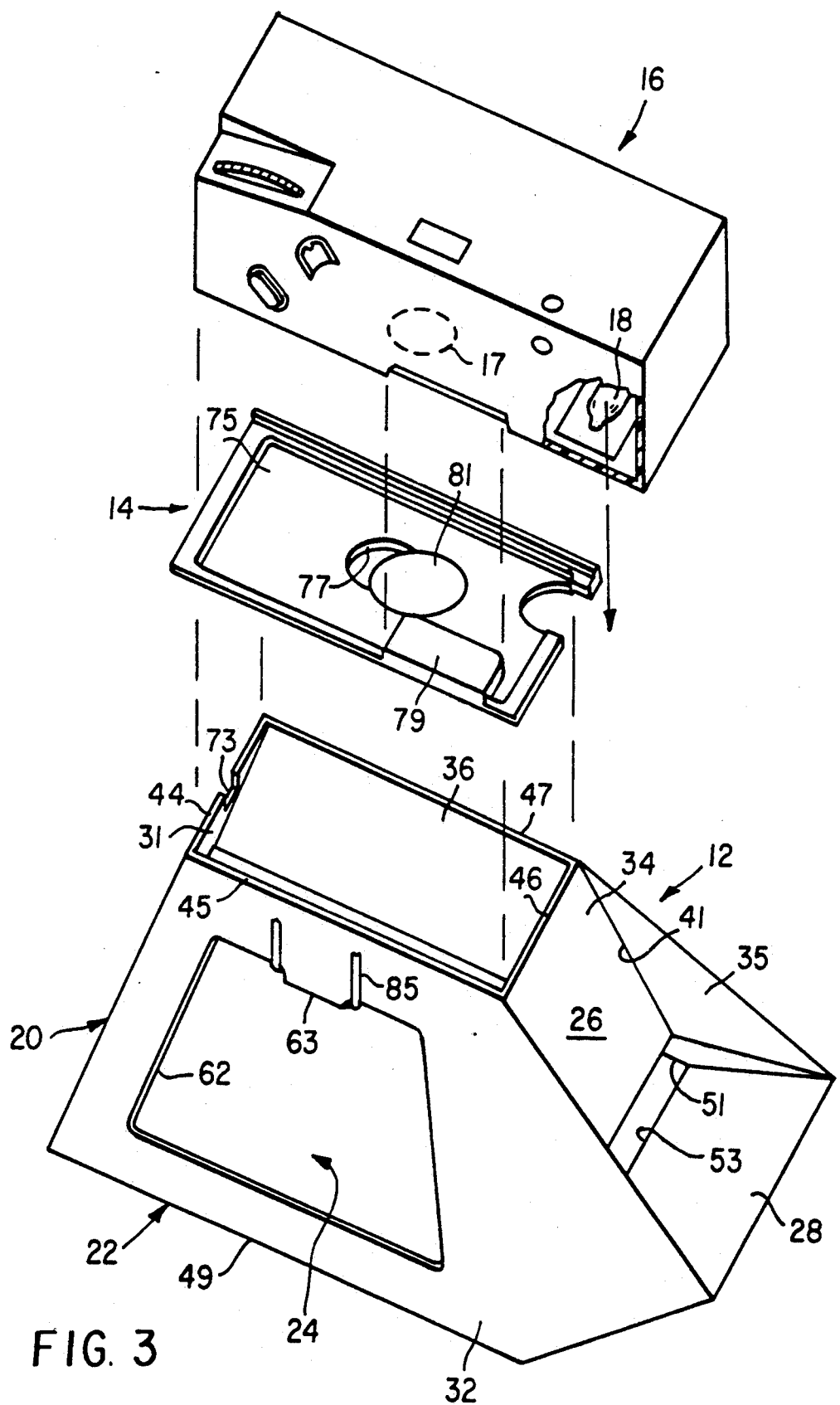
FIG. 3 is an exploded view of a copy stand according to the invention showing how a camera, the camera nest and the copy-stand base fit together in only one proper orientation.

Referring now to the drawings, and beginning with a brief overview of the preferred embodiment depicted in FIGS. 1–4, a single sheet of paper board 10 (FIG. 1), is die cut, scored and marked for assembly, by folding, into a copy-stand base 12 (FIG. 3). The base is then coupled to a nest 14 for receiving a camera 16 having a built in flash device 18. The paper board is configured with appropriately shaped panels, and provided with fold lines between the panels, so the base 12, when assembled, will define a tapered, generally tubular section 20 extending from one end at the nest 14, adjacent the camera, to an opposite end 22. This opposite end establishes an exposure area 24 for properly positioning a subject to be copied photographically relative to the camera 16. The paper board also is configured so the assembled base will block direct flash illumination of the subject, while at the same time enhancing indirect flash illumination of the subject. Such enhancement is provided by a baffle 26 and first and second reflecting surfaces 28 and 30 (FIG. 4), described more fully hereinafter, which provide indirect diffuse illumination of the subject from a plurality of directions.

Referring more specifically to the details of the preferred embodiment and to FIG. 1, the paper board 10 is depicted as a calendered sheet sometimes referred to as SBS or solid blended sulfate, preferably 0.51 milimeters (0.020 inches) thick, that is die cut, scored and marked for folding into a copy-stand base. As used in this application, the term paper board is intended to include cardboard. Although not preferred, E-flute corrugated board has been found satisfactory.

The paper board defines seven stiff and flat panels 31–37, six of which, panels 31–36, are arranged in a generally circular configuration in counterclockwise order as viewed in FIG. 1. The seventh panel, panel 37, extends approximately radially outwardly from panel 36.

Each of the seven panels is a polygon having straight edges defined either by fold lines, such as the fold lines 38–43 between the panels, or by the peripheral edges of the panels themselves. Panels 31, 32, 34 and 36, respectively, define top edges 44, 45, 46, and 47, and bottom edges 48, 49, 50 and 51, such that the perpendicular distance, or height, between the top and bottom edges of panels 31, 32, and 36 is equal, but the corresponding distance between the top and bottom edge of panel 34 is shorter. Similarly, the perpendicular distance between top edge 52 and bottom edge 53 of panel 37 is shorter than the corresponding distance of panels 31, 32 and 36.

Figure 4:
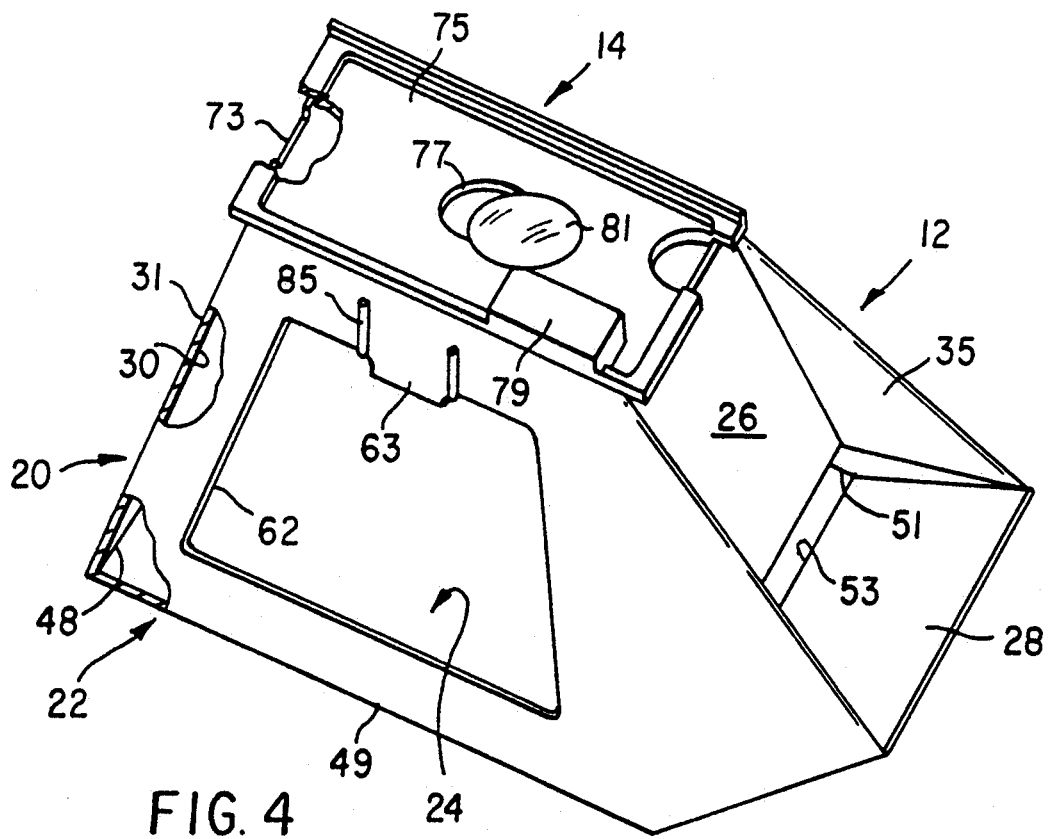
FIG. 4 is a perspective view depicting the copy-stand base assembled from the sheet stock of FIG. 1 and the nest of FIG. 2.

The reasons for these and other soon to be described panel features will become more apparent from the description that follows in connection with FIGS. 3 and 4. Continuing, however, with the details of FIG. 1, it should be recognized that the configuration of the panels and the location of the fold lines, depicted most clearly in FIG. 1, establish the desired shape and features of the base after it is assembled.

Panels 33 and 35 are triangles that are mirror images, one of the other. Panel 33 has an apex that meets panels 32 and 34 at their top edges 45 and 46. The corresponding apex of panel 35 meets panels 34 and 36 at their top edges 46 and 47.

Panels 31 and 36 are adapted to be coupled together along their edges 54 and 55, and for this purpose include tab 56 extending from panel 31 adapted for receipt in slot 57 between panel 36 and an extension 58 thereof. Similarly, panels 32 and 37 are adapted to be coupled together by tab 59 on panel 37 and slot 60 between panel 32 and its extension 61.

Other features of the paper board that are depicted in FIG. 1, but whose purpose will become more apparent from the description associated with FIG. 3, include a cut-out 62 in panel 32, and tabs 63 and 64, respectively, in panels 32 and 36. The cut-out permits viewing through the base of a subject to be copied. The tabs accommodate a flexible fastener for securing a camera and nest to the base.

When the sheet stock is properly assembled by folding along the scored lines between the panels, and the panels are coupled together by inserting the tabs 56 and 59 in slots 58 and 60, it will form a generally tubular configuration comprising the copy-stand base 12, depicted most clearly in FIGS. 3. The top edges 44, 45, 46, and 47 of panels 31, 32, 34, and 36 all are aligned in a first common plane defining the one end of the tubular section adjacent nest 14. The bottom edges 48 (FIG. 4), 49, 51, and 53 of panels 31, 32, 36, and 37 all are aligned in a second common plane, parallel to the first plane, which defines the opposite end of the tubular section. As should now be apparent from the above description, the second plane corresponds to the exposure area which is the proper location for a subject to be copied, while the first plane provides a reference for properly locating a camera, through the nest and with correcting optics, to expose a subject in the exposure area.

When the paper board is folded to assemble the base, most of the panels and tabs are folded in the same direction, toward the viewer along the fold lines in the orientation of the paper board depicted in FIG. 1. Fold lines 40 and 41 are exceptions which fold the adjacent panels opposite the other folds, or away from the viewer in the FIG. 1 orientation of the paper board. This places triangular panel 33 in facing relationship adjacent panel 32, and similarly places triangular panel 35 in facing relationship adjacent panel 36, thereby displacing panel 34 away from panel 37 as depicted in FIGS. 3 and 4. Panel 34 then is positioned to act as the baffle 26 for blocking direct illumination of the exposure area 24 by the camera flash device 18 (FIG. 3). Panel 37, on the other hand, is positioned both to define with panel 34 an opening in the tubular section and to act as the reflector 28 for directing illumination from the flash device indirectly around the baffle 26 and through the opening toward the exposure area.

The angle of the reflecting panel 28 is selected to direct most of the reflected illumination from the flash device toward a subject located in the exposure area. However, significant illumination escapes to other surfaces of the paper board inside the base, particularly the opposed surface of panel 31. This surface acts as the second reflector 30, opposite the exposure area from reflector 28, for redirecting illumination back toward the exposure area, and thereby providing illumination of any subject in the exposure area from a second direction opposite the direction of the illumination from the first reflector 28.

In the preferred embodiment, both reflectors 28 and 30 are provided with coatings or diffuse reflecting tape, and the surface of reflector 30 is more reflective than surface of reflector 28. In other embodiments, however, a white or light surface on the paper board is sufficient for the desired effect. When the surface of the paper board is used without additional applications, the entire inside of the base acts to redirect illumination toward the subject.

Referring now to FIG. 2, and the camera nest, it is molded of plastic and configured on one side 67 to mate with the base 12 in only one proper orientation. A lip 69 around the periphery of the nest includes a tab 71 configured to mate with a corresponding notch 73 in base panel 31. In a somewhat similar manner, the opposite side 75 of the nest includes recesses and abutments 77 and 79, respectively, for receiving and supporting a camera in only one predetermined orientation. Thus, when a camera is properly received in the nest and the nest is properly received in the base, the camera focal plane defined by objective 17, and its flash device 18, will be located in known predetermined positions and distances relative to the base panels and the exposure area.

Another desirable feature of the nest is a diopter 81 suitable for adjusting the camera focus to the relatively short predetermined distance between the camera position and the exposure area. Fixed focus cameras can then be used with the copy stand.

For auto-focusing cameras, such as those that use an Infra-red beam to determine the camera-subject distance, a portion of the nest can be used to block the beam and force the camera into a default focus. The diopter can then be chosen to correct for the default focus.

In the preferred embodiment, the camera 16 is a single use camera and the nest is provided with a recess 83 to permit actuation of such a camera while on the nest.

The camera and nest are retained in their respective positions on the base by a flexible band 85 stretched around the camera and nest between tab 63 on panel 32 and tab 64 on panel 36. Since the tubular section and an opaque nest would completely block the view of the subject in the exposure area, the panel 32 is cut out in a central portion 62 to permit viewing and proper positioning of the subject just before exposure.

DESCRIPTION OF AN ALTERNATE EMBODIMENT

Figure 5:
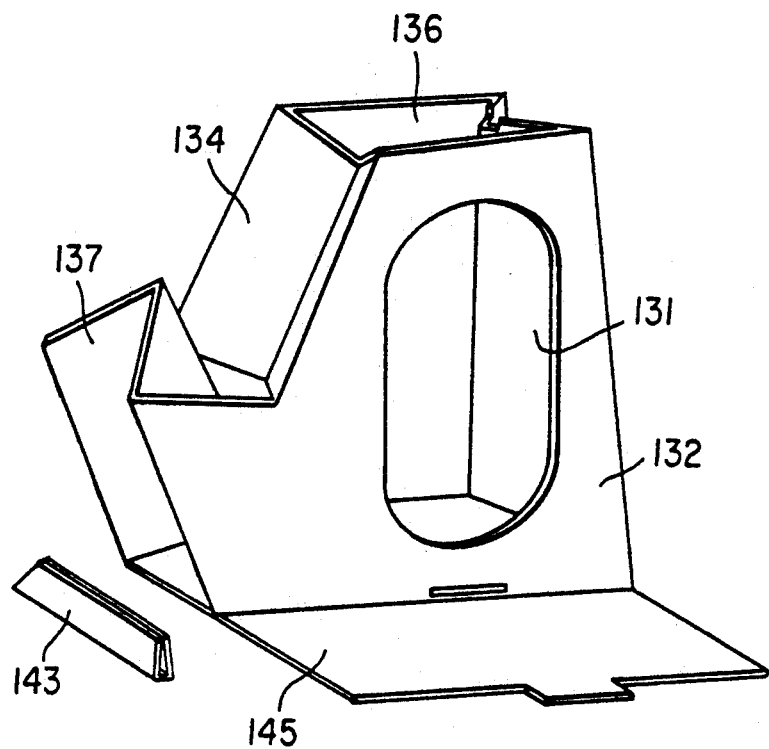
FIG. 5 is a partial perspective view of an alternative embodiment of the invention depicting accordion folds for collapsing or erecting the copy-stand base.

An alternative embodiment of the invention is depicted in FIG. 5. Although assembled like the preferred embodiment, in this alternative, the base is formed of panels 131, 132, 134, 136, and 137, corresponding to panels 31, 32, 34, 36, and 37 in the preferred embodiment. Panels 131, 134, and 137 are folded accordion style to collapse the base for sale and storage. In use the base is unfolded and clips 143 are applied to the bottom edges of the unfolded panels to maintain them in a generally flat condition.

An additional panel 145 is provided to act as a floor and background under the subject in the exposure area.

It will be now appreciated that a copy stand and a base therefor, provided in accordance with the invention, may be inexpensive and particularly well suited for convenience applications. When presented for sale, the base is flat or compact and may include colored designs and directions printed on one side of the paper board, the side opposite the reflecting surfaces. After use the base may be disassembled or collapsed again for convenient storage. The nest also is suited for convenience applications including cameras, like single use cameras, that have no provision for a tripod mount.

In accordance with other aspects of the invention, the base is particularly well suited for photographing jewelry and other nearly flat but three dimensional objects for record keeping purposes. The multi-directional illumination provides outstanding results when recording such objects. Similarly, the second reflecting surface helps correct for flash falloff with distance from the flash device and permits use of transparency and other photographic films of relatively low exposure latitude. In accordance with other aspects of the invention, the copy-stand base acts like a tent that covers the subject excluding ambient illumination and redirecting flash illumination toward the subject from many different directions While the invention has been described with particular reference to a preferred and alternate embodiment, it will be understood by those skilled in the art that various changes may be made and equivalents may be substituted for elements of the described embodiments without departing from the invention. In addition, modifications may be made to adapt a particular situation and material to a teaching of the invention without departing from its essential features.

What is claimed is:

1. A copy stand for locating a camera relative to a subject to be copied, the camera having an objective and a flash device, said copy stand comprising:
   a nest for receiving the camera with the objective and flash device in predetermined positions relative to the nest;
   paper board folded and coupled to itself to form a generally tubular section, said generally tubular section extending from one end coupled to said nest to an opposite end for surrounding the subject and establishing the position of the subject relative to the camera objective;
   said generally tubular section including a baffle extending from adjacent the one end for blocking the flash device from directly illuminating the subject;
   said generally tubular section including a diffuse reflecting panel extending from adjacent the opposite end and beyond the baffle for defining with said baffle an opening in said generally tubular section and for directing illumination indirectly around the baffle from the flash device toward the subject.

2. A copy stand according to claim 1, wherein said generally tubular section defines interior surfaces comprising second diffuse reflectors for redirecting illumination from the reflecting panel toward the subject.

3. A copy stand according to claim 1, wherein said generally tubular section includes means defining a second opening for viewing the subject through the tubular section.

4. A copy stand according to claim 3, wherein: said generally tubular section is substantially closed between said one and opposite ends, except for: a) said opening defined by said baffle and said reflecting panel, and b) said second opening for viewing the subject.

5. A photographic copy stand for locating an image plane of a subject to be copied relative to a camera, the camera having a flash device and an objective defining a focal plane, said copy stand comprising:
   a camera nest having a configuration for receiving the camera with the focal plane and flash device in predetermined positions relative to the nest;
   a single sheet of paper board material folded and coupled to itself to form a tapered generally tubular section, said generally tubular section defining interior and exterior surfaces and extending from one end coupled to said nest to an opposite end where said generally tubular section establishes the image plane parallel to said predetermined position of the focal plane;
   said generally tubular section including a baffle for blocking the flash device from directly illuminating the subject;
   said generally tubular section including a diffuse reflecting panel having means for defining with said baffle an opening in said tubular section and for directing illumination around the baffle from the flash device through the opening and generally toward the subject.

6. A copy stand according to claim 5, wherein said interior surfaces of said generally tubular section define diffuse reflecting surfaces for redirecting flash illumination from said diffuse reflecting panel toward said subject.

7. A sheet of paper board foldable to form a generally tubular base of a photographic copy stand for locating a camera with a flash device relative to a subject to be photographed, said paper board comprising:

seven stiff panels adjacent one another with six of the panels in a generally circular arrangement in counter-clockwise order, one through six, and the seventh panel extending from panel six, each of said seven panels defining polygons;

said panels one, two and six having top and bottom edges and being equal in height between their top and bottom edges;

said panels four and seven having top and bottom edges and being shorter in height between their top and bottom edges than said panels one, two and six;

said panels three and five defining triangles, one a mirror configuration of the other;

means for establishing straight fold lines between each of said panels one through seven where said paper board is more easily folded and is marked to facilitate folding;

means for coupling an edge of panel one to an edge of panel six and for coupling an edge of panel seven to an edge of panel two with the top edges of panels one, two, four and six aligned in a first common plane and with the bottom edges of panels one, two, six and seven aligned in a second common plane parallel to the first common plane;

said panels having configurations, and said fold lines having locations, for forming when folded along said fold lines, a generally tubular base with said forth and seventh panels defining an opening there between and said seventh panel providing a reflector for directing illumination from the flash device through the opening and toward the second plane.

8. The invention of claim 7, wherein the paper board defines a light-colored diffuse reflecting surface on one side thereof.

9. A collapsed copy-stand base formed of sheet material and erectable for locating a camera with a flash device relative to a subject to be copied, said collapsed copy-stand base comprising:

a sheet of paper board folded into flat panels and coupled together at the folds to form a tapered tube collapsed accordion fashion, said tube defining interior and exterior surfaces and extending from one end for establishing a camera position to an opposite end for establishing a subject position;

means including at least one of said flat panels erectable by unfolding to a position defining a baffle for blocking the flash device from direct illumination of the subject;

means including at least one other of said flat panels erectable by unfolding to a position defining a reflecting surface and including means for defining with said baffle an opening in the tubular section for directing illumination indirectly around the baffle from the flash device through the opening and generally toward the subject; and, accordion means for erecting said tube by unfolding to position said baffle in said blocking position, to position said reflecting surface in said illumination directing position and for opening said tube to permit a camera at the one end to view for photographic exposure the subject at the opposite end.

10. The invention of claim 9, wherein the interior surfaces of said tube are light in color and define diffuse reflectors for redirecting illumination from inside said tube toward the subject.

* * * * *